United States Patent [19]

Delapp

[11] Patent Number: 4,834,329
[45] Date of Patent: May 30, 1989

[54] MONITOR SUPPORT FOR A TERMINAL

[76] Inventor: Michael Delapp, 1427 Vallejo Dr., San Jose, Calif. 95135

[21] Appl. No.: 55,290

[22] Filed: May 29, 1987

[51] Int. Cl.⁴ ............................................. F16M 13/00
[52] U.S. Cl. ..................................... 248/183; 248/371; 248/280.1; 248/292.1; 248/1 I
[58] Field of Search ...................... 248/183, 280.1, 184, 248/292.1, 284, 1 A–1 J, 123.1, 585, 159, 422, 371, 372.1, 586, 281.1; 108/145; 297/307

[56] References Cited

U.S. PATENT DOCUMENTS

| | | | |
|---|---|---|---|
| 3,008,259 | 11/1961 | Zornes | 248/284 |
| 3,426,190 | 2/1969 | Bobrick | 248/284 X |
| 4,234,150 | 11/1980 | Mee et al. | 248/324 X |
| 4,589,621 | 5/1986 | Hunt et al. | 248/586 |
| 4,692,886 | 9/1987 | Wendling et al. | 248/183 |

FOREIGN PATENT DOCUMENTS

| | | | |
|---|---|---|---|
| 571412 | 3/1959 | Canada | 248/284 |
| 2847135 | 5/1980 | Fed. Rep. of Germany | 248/1 C |

*Primary Examiner*—Alvin C. Chin-Shue

[57] ABSTRACT

There is disclosed a mounting means for a terminal comprising, in essence, a double parallelogram including a lower arm pivoted to the base, an upper arm connected to a monitor and elbow means interconnecting the other ends of the arms whereby the connection between the upper arm and the monitor moves vertically relative to the connection between the lower arm and the base. The mounting means includes friction means to hold the same in a set position vertically and may also include spring means for counterbalancing the monitor, a turntable on the base to provide for swinging the monitor about a vertical axis and a frictioned hinge providing for tilting the monitor about a horizontal axis.

1 Claim, 5 Drawing Sheets

MONITOR SUPPORT FOR A TERMINAL

This invention relates to a support for the monitor of a terminal, and particularly to a support that provides for raising and lowering the level of the display screen of the monitor and for tilting the display screen about a horizontal axis to position the monitor at a more comfortable level and angle for viewing by the operator of the terminal.

BACKGROUND OF THE INVENTION

Monitors have heretofore been adapted to be tilted about a horizontal axis to face the operator and have been mounted on supports that permit raising and lowering the display screen of the monitor relative to the line of sight of the operator and turning the monitor about a vertical axis to face the operator. One example of such a terminal is the one marketed by Wyse Technology. That terminal includes a monitor supported on one end of an arm pivotally connected at its opposite end to a base. Supports of this nature, however, physically move the monitor horizontally relative to the base as the supporting arm is moved between its raised (vertical) position and its lowered (horizontal) position, that is, when the monitor is raised and lowered, it also moves toward and away from the operator.

This makes it difficult to adjust the position of the monitor relative to the operator since, when the monitor is raised and lowered, it must also be adjusted forwardly, backwardly or sidewise to reposition it relative to the operator as it was before it was raised or lowered. At the same time, shifting the monitor horizontally relative to a base as it is raised and lowered also shifts its center of gravity, which in turn requires a larger and more massive base to support the monitor upright on the base—or in other words, to keep the monitor from becoming unbalanced and falling over.

In the Wyse terminal, the monitor is disposed on a base that provides for rotation of the monitor about a vertical axis as well as tilting about a horizontal axis, and the monitor and base are mounted as a unit on the supporting means for raising and lowering the monitor. This arrangement increases the weight of the elements that are elevated which in turn requires a more substantial supporting means and/or more effort to raise and lower the monitor.

Another problem with monitors such as those in the Wyse terminal is that the tilt angle of the display screen relative to the vertical is also moved as the monitor is raised and lowered. This requires that the tilt angle of the display screen be readjusted whenever the elevation of the monitor is adjusted. Using a parallelogram in the arm of course will maintain the tilt angle of the display screen as the monitor is raised and lowered but the monitor is still shifted horizontally relative to the supporting base.

With a terminal supported on an arm that is connected to the monitor through a ball and socket connection, the tilt angle of the display screen is limited to perhaps 20°. While the total tilt angle can be divided between the positive and negative angles of tilt, only a limited fraction of this is normally available for the negative tilt angle.

SUMMARY OF THE INVENTION

An object of this invention is to provide a monitor supporting means in which the monitor can be readily raised and lowered relative to the operator over a relatively large range without tending to cause the monitor to become unbalanced and to fall over. Further objects of this invention are to provide such a monitor supporting means in which the monitor can also be adjusted about a vertical axis on the supporting surface, and in which the display screen can be tilted about a horizontal axis towards the operator over a wider range than has heretofore been available.

In accordance with this invention, the above objects are achieved by a monitor supporting means comprising a double parallelogram in which there are a pair of pivotally interconnected arms each of which comprises a parallelogram, which arms are connected at their outer ends to the monitor and to the base, respectively. The parallelograms include spring means to counterbalance the weight of the monitor as well as friction means to maintain the monitor in the adjusted vertical position. The monitor is also mounted for tilting on the supporting arm to position the display screen relative to the operator and for rotation about a vertical axis on the support.

BRIEF DESCRIPTION OF THE DRAWINGS

The present invention is herein disclosed with reference to the accompanying drawings in which.

DETAILED DESCRIPTION OF THE INVENTION

Figure 1:
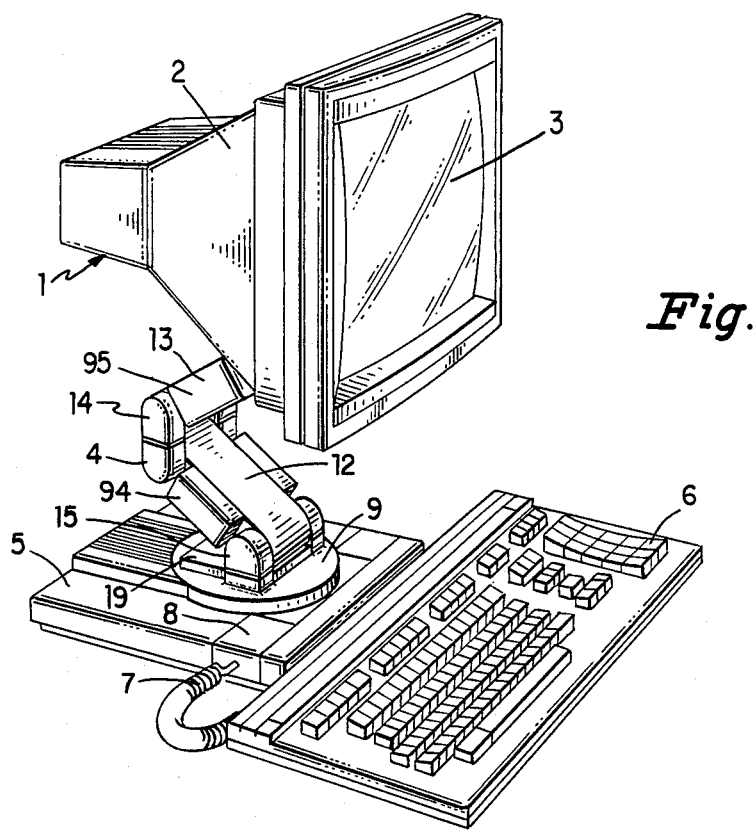
FIG. 1 is a perspective view of a terminal including a monitor having support means in accordance with this invention.

With reference to FIG. 1, there is shown a terminal generally indicated at 1 that includes a monitor 2 having a display screen 3. The monitor 2 is supported by a support 4 on a chassis or base 5 that has some processing capability and is adapted to have input/output connections in the form of cartridges (not shown) plugged into the back thereof. The base is also adapted to be connected to a keyboard 6 by a cable 7 and a keyboard cartridge 8 that is plugged into the side of the base 5.

A turntable 9 is mounted on the base 5 for rotation about a vertical axis—or on an axis normal to the base 5—by a screw 10 (FIG. 2) extending through an aperture centrally of the turntable 9 and threaded into a boss 11 upstanding within the base 5.

The support 4 comprises generally a lower arm 12 and an upper arm 13 that are interconnected at one end thereof by an elbow hub 14 and are connected at their opposite ends, respectively, to a hub 15 that is adapted to be secured to the turntable 9 and a hub 16 that is adapted to be secured to the monitor 2.

Figure 2:
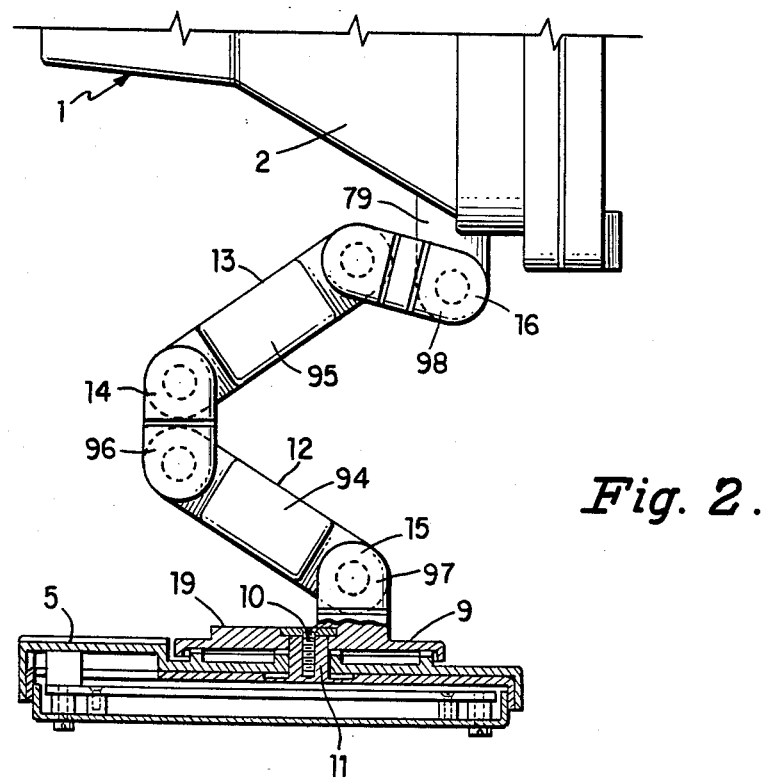
FIG. 2 is elevational view, partly broken away and partly in section, of a monitor and base showing in general the support for the monitor.
Figure 3:
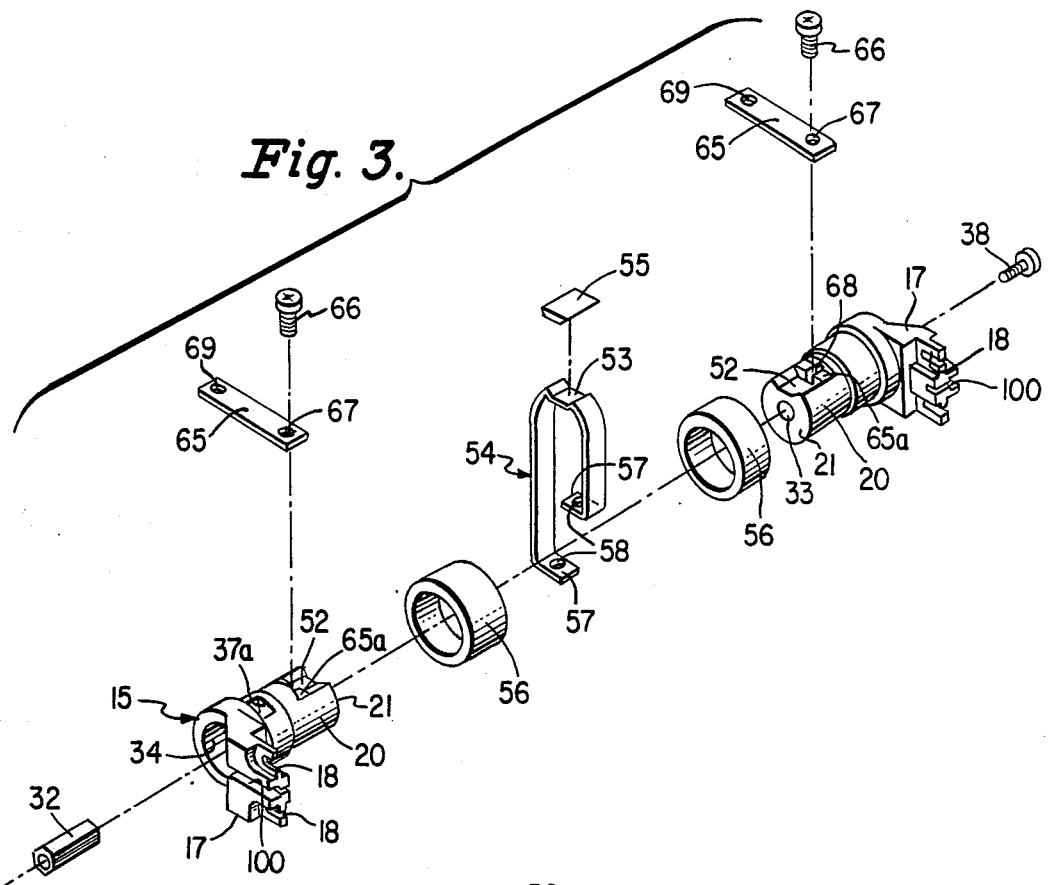
FIG. 3 is an exploded perspective view of the lower hub of the monitor support of FIG. 1.

With reference to FIG. 3, the hub 15 comprises a pair of hub or pivot elements 17 having slots 18 for fastening screws (not shown) that are adapted to be threaded into a boss 19 (FIG. 2) on the top of the turntable 9 to secure the hub elements 17 to the turntable 9. The hub elements 17 include cantilevered cylindrical shaft sections 20 and end walls 21 that abut when the hub 15 is assembled.

Figure 6:
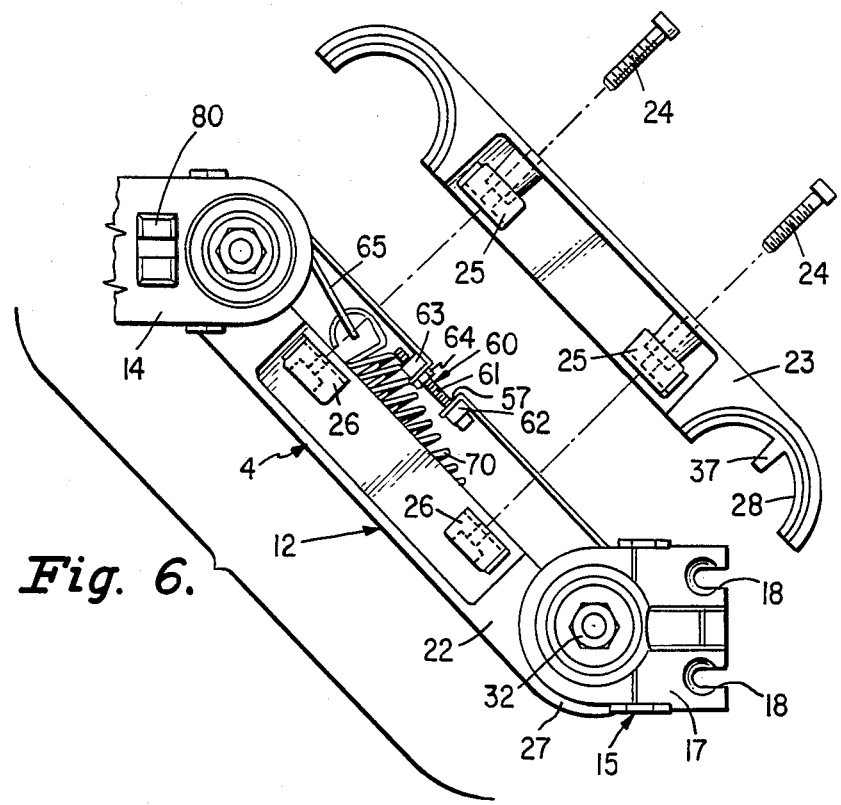
FIG. 6 is a fragmentary side elevational view of a portion of the monitor support.

The shaft sections 20 together define the shaft on which one end of the arm 12 (FIG. 6) is mounted. As shown in FIG. 6, the arm 12 comprises a pair of complementary arm portions including a lower portions 22 and an upper portion 23 that are adapted to be secured together as by screws 24 extending through bosses 25 on the outer walls of the upper portion 23 and cooperating bosses 26 on the outer walls of the lower portion 22. The arm portion 22 and 23 have semi-cylindrical ends 27 and 28, respectively, that encompass and are clamped about the shaft sections 20 of the hub elements 17 for pivotal movement thereon.

Figure 4:
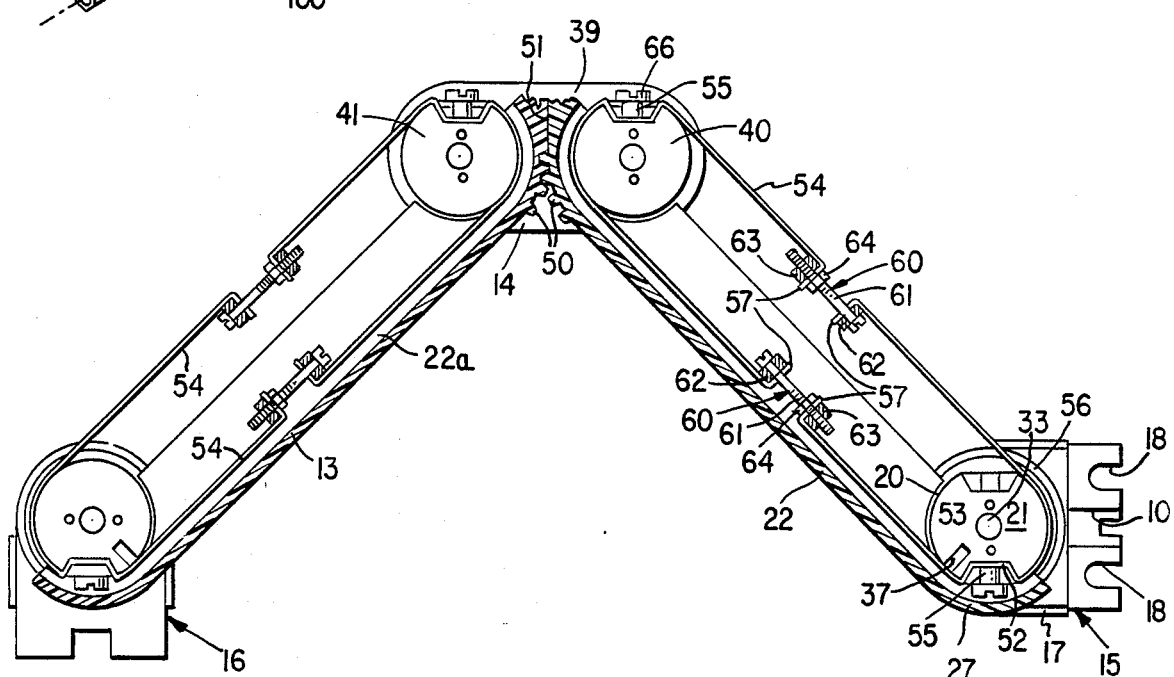
FIG. 4 is a vertical sectional view centrally through the monitor support per se.
Figure 7:
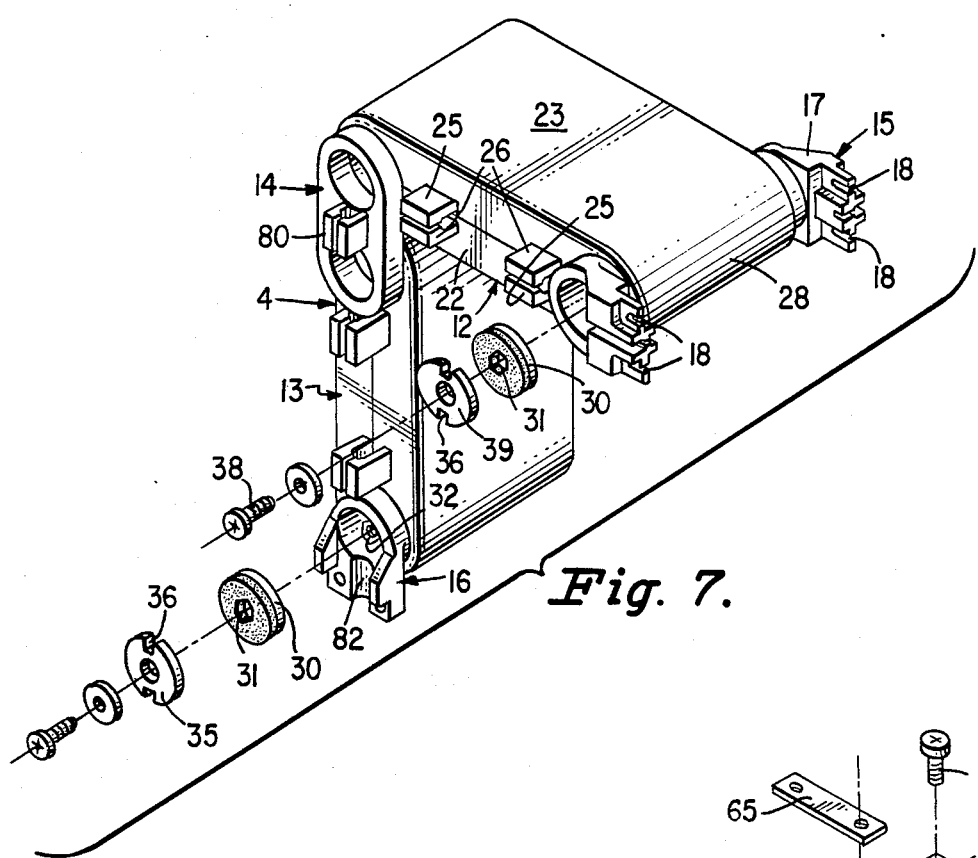
FIG. 7 is a perspective view, partly exploded, illustrating the arm per se.

The arm 12 is frictionally restrained against rotation on the hub 15 by clutch means comprising a clutch pad 30 (FIG. 7) having a hexagonal bore 31 adapted to receive an elongated hexagonal nut 32 (FIG. 3). The nut 32 extends through matching hexagonally shaped apertures 33 in the end walls 21 (FIG. 3) of the hub elements 17 and is thus held against rotation relative to the hub elements 17 and, in turn, holds the clutch pad 30 against rotation. The hub element 17 has a bore 34 extending inwardly from the outer end thereof in which the clutch pad 30 is positioned on the hexagonal nut 32. Outwardly of the clutch pad30, there is mounted on the nut 32 a clutch plate 35 (FIG. 7) having notches 36 in the periphery thereof. A lug 37 (FIG. 4 an 6) formed internally of the hemispherical end 28 of the upper part 23 of the arm 12 extends through an aperture 37a (FIG. 3) in the peripheral wall of the hub element 17 into one of the notches 36 to key the clutch plate 35 to the arm 12 for pivotal movement.

A screw 38 (FIG. 3) is threaded into the bore at one end of the hexagonal nut 32 with the head of the screw 38 adapted to abut against the inner face of the end wall 21 of the hub element 17 to position the hexagonal nut 32 in the bores 21. A similar screw 38a (FIG. 7) is adapted to be threaded into the opposite end of the nut 32 and to force the clutch plate 35 against the clutch pad 30 and, in turn, to force clutch pad 30 against the inner face of the end wall 21 to compress the clutch pad and thus control the frictional resistance to movement of the clutch plate 35 relative thereto. Thus, as the arm 12 is pivoted about the axis of the hub 15, the clutch plate 35 moves with it relative to the clutch pad 30 which is held stationary in the hub 15, to frictionally resist movement of the arm.

Figure 8:
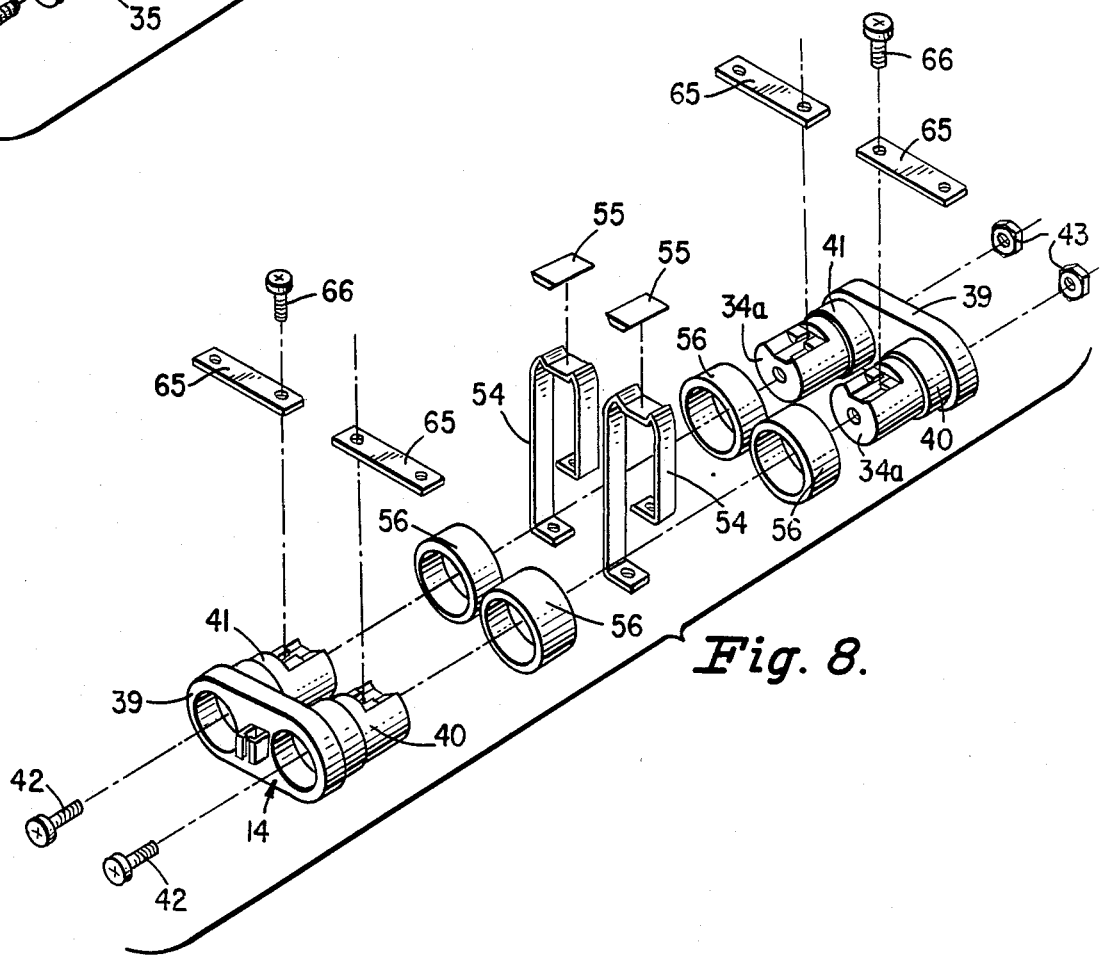
FIG. 8 is an exploded perspective view similar to FIG. 3 of the elbow hub.

The elbow hub 14 comprises opposed base plates 39 (FIG. 8) from which extend two pairs of hub elements 40 and 41, each of which is similar to a hub element 17 of the lower hub 15 except that the pairs of hub elements 40 and 41 are secured together through the end walls 21a thereof by bolts 42 adapted to receive nuts 43. The connection of the arm 12 to the hub elements 40 is the same as the connection to the hub elements 17.

The second pair of hub element on the elbow hub 14, that is, the hub element 41, are connected to the upper arm 13 in the same manner as the lower arm 12 is connected to the hub elements 40 the arm 13 being formed in two parts 22a and 23a (FIG. 7) that are secured together to clamp the semi-cylindrical ends thereof about the hub elements 41.

The opposite end of the upper arm 13 is connected by the hub 16 to a shaft 45 (FIG. 10) on which the monitor 2 is mounted. Except for the connection to the shaft 45, the hub 16 is the same as the hub 15 including the clutch pad 30 and clutch plate 35.

The elbow hub 14 is dimensioned lengthwise relative to the thickness of the arms 12 and 13 so that when the monitor 2 is lowered to its lowermost position, the arm are horizontal and flat against each other.

Figure 5:
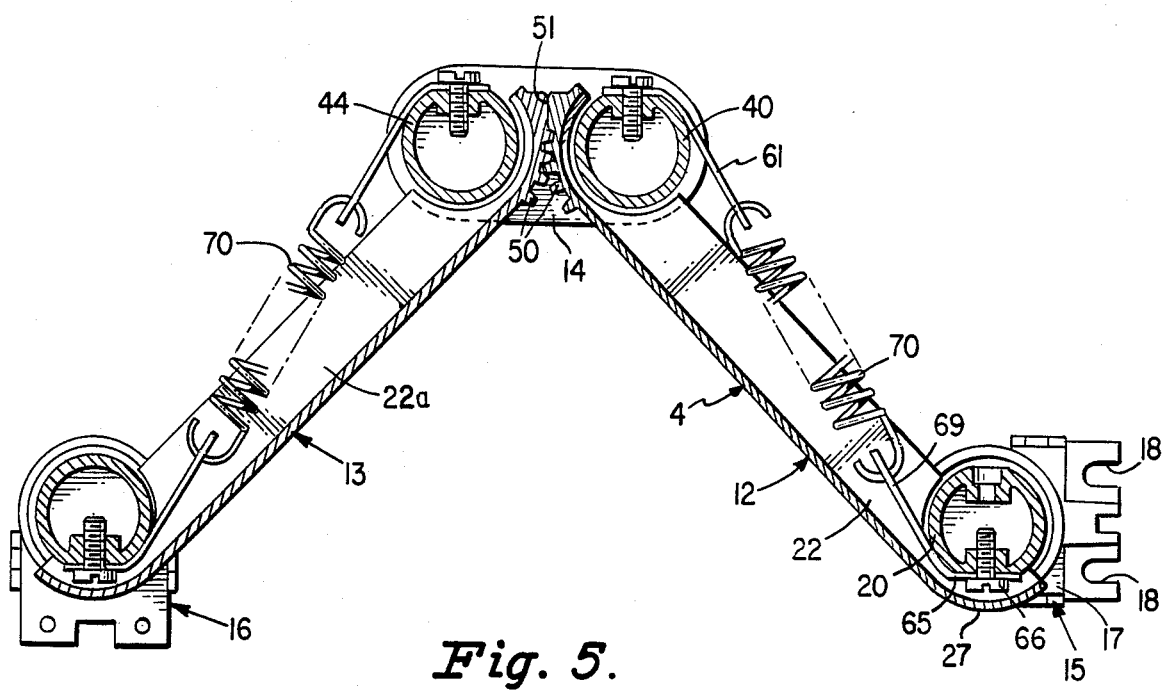
FIG. 5 is a view similar to FIG. 4 through a different portion of the monitor support.

The upper and lower arms 12 and 13 are locked together for rotation at the elbow hub 14 by intermeshing gear segments 50 (Figs. 4 and 5) formed on the periphery of the lower portions 22 and 22a of the arms concentrically of the axes of the hub elements 40 and 41. Movement of the arms 12 and 13 about the hub elements 40 and 41 in the direction to align the arms endwise is limited by abutting faces 51.

As seen in FIG. 3, the hub elements 17 are each formed with a recess 52 in the periphery thereof adjacent their free or inner ends. The recesses 52 are adapted to receive a retainer portion 53 of a flexible steel band 54—the portions 53 being bent into the bands 54 to conform to the configuration of the recesses 52. A key 55 is seated in each of the recesses 52 above the retainer portion 53 to lock the band 54 against movement relative to the hub elements 17.

The key is held in the recesses 52 by the edge of a spring steel band 65 at each end thereof, each of the bands 65 being secured by a screw 66 on a flat 65a formed in the hub element 17 at the inner end of the recess. Each of the screws 66 extends through a hole 67 in the band 65 and is threaded into a bore 68 (Fig.5) in the hub element 17. A pair of bushings 56 are provided on the bearing portion of the shaft portions 20 of the hub elements 17 for journalling the arm on the hub.

The pairs of hub elements 40 and 41 of the elbow hub 14 and the hub elements of the hub 16 are each also provided with a flexible steel band 54 like the one on the hub elements 17.

The free ends of the bands 54 are each bent at right angles to form brackets 57 (FIG. 3) having apertures 58. The brackets 57 at the ends of the band 54 that is secured to the hub 15 are adapted to be joined by tensioning means 60 (FIG. 4) to the brackets 57 at the ends of the band 54 secured to the hub elements 40 of the elbow hub 14. The tensioning means 60 at each end of a band 54 comprises a bolt 61 extending through the apertures 58 and through a guide 62 at the bracket 57 adjacent the head of the bolt 61. The opposite end of the bolt 61 is threaded through a nut 63 and a locking nut 64.

The band 54 on the hub elements 41 of the elbow hub 14 is connected in a similar manner to the band 54 on the hub elements of the upper hub 16.

The free end of each of the bands 65 on the hub elements 17 is formed with an aperture 69 in which one end of a tension spring 70 (FIG. 5) is hooked. The other ends of the tension springs 70 are hooked to the corresponding bands 65 secured to the hub elements 40 of the elbow hub 14. Similar tension springs 70a are connected between the bands 65 that are secured respectively to the hub elements 41 of the elbow hub 14 and the hub elements of the upper hub 16.

The pairs of springs 70 and 70a are enclosed in the lower arm 12 and the upper arm 13 respectively and are disposed on either side of the bands 54. The arms 12 and 13 are thus biased about the pivot axis of the hubs 14, 15 and 16 into their raised or vertical position in which the arms are aligned endwise. The bias opposes the downward movement of the hub 16 under the weight of the monitor 2, thus counterbalancing the monitor 2.

Friction at the clutch pads 30 and clutch plates 35 is sufficient to prevent movement of the hub 16 downwardly under the weight of the monitor 2 relative to the lift of the tension springs 70 and 70a so that the monitor 2 will remain in a set position vertically. At the same time, the monitor 2 can be manually raised or lowered by slipping the clutch surfaces to re-position monitor 2 at a different level vertically.

The bands 54 together with the gearing 50 in effect comprise a double parallelogram locking the lower and upper arms 12 and 13 together for parallel motion of the hub 16 relative to the hub 15 whereby, as the hub 16 is raised and lowered relative to the hub 15, it moves in a line vertically toward and from the hub 15. At the same time, through the action of the parallelogram, the hub 16 and thus the monitor 2 supported thereon are not tilted as the monitor is raised and lowered, or in other words, the elements of the hub 16 remain in a fixed angular relation relative to the hub elements 17 of the hub 15 and the hub elements 40 and 41 of the elbow hub 14.

Figure 9:
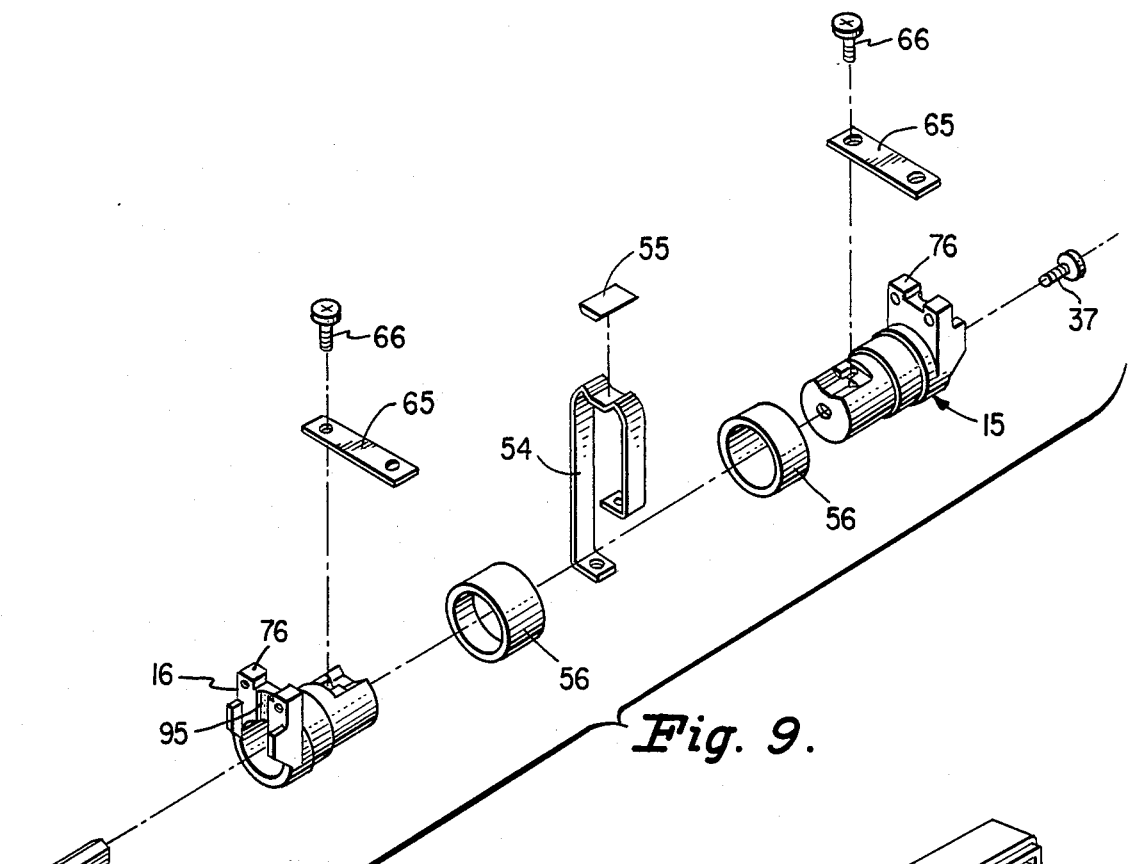
FIG. 9 is an exploded perspective view similar to FIG. 3 of the upper hub.
Figure 10:
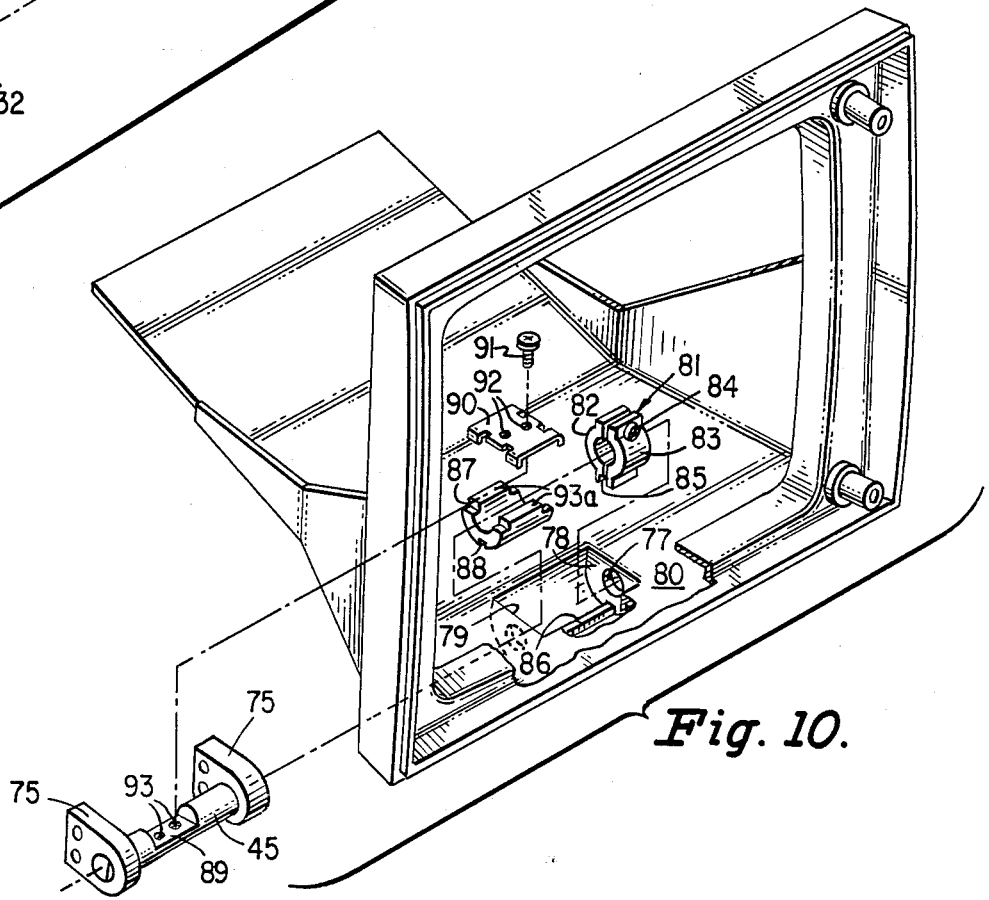
FIG. 10 is a fragmentary perspective view with parts exploded to show the connection between the monitor and the support.

As mentioned above, the upper hub 16 is secured to the shaft 45 on which the monitor is mounted. With reference to FIG. 10, the shaft 45 has a connecting element 75 fixed thereto at each end. The connecting elements 75 are adapted to be secured by screws (not shown) to the fastening portions 76 (FIG. 9) on the hub elements of the hub 16.

The shaft 45 extends through bores 77 in the end walls 78 of a well 79 depending from the bottom wall 80 of the monitor 2. The shaft 45 is connected to the monitor 2 for frictionally resisted pivotal movement of the monitor 2 about the axis of the shaft 45 by a clutch 81 having a pair of clutch elements 82 and 83 that encircle the shaft 45 and are connected together at their lower ends as by a rivet (not shown) whereby the clutch elements are relatively loose but are held against separation at their lower ends. At their upper ends the clutch elements are adapted to be pulled together to clamp the same on the shaft 45 by a screw 84 that extends through one of the clutch elements 82 and 83 and is threaded into the other. The clutch elements 82 and 83 are formed with a groove 85 in the bottom edges thereof that is adapted to receive a rib 86 formed in the bottom of the well 79 parallel to the axis of the shaft 45 to hold the clutch 81 against rotation relative to the monitor 2. Thus the monitor is frictionally held in the set position relative to the shaft 45 by the clutch 81 but can be adjusted to adjust the tilt angle of the display screen by a force sufficient to overcome the frictional resistance of the clutch 81.

The effect of gravity tending to pivot the monitor about the shaft 45 as the monitor is adjusted to different tilt positions is counterbalanced by a semi-cylindrical rubber spring 87 that is seated in the well 79 and which has a longitudinal groove 88 in the bottom thereof that receives the rib 86 to lock the rubber spring 87 against turning in the well about the axis of the shaft 45. The shaft 45 is formed with a flat 89 to which a spring plate 90 is secured as by screws 91 extending through apertures 92 in the plate and threaded into bores 93 in the shaft 45. The spring plate 90 outwardly of the shaft 45 overlies the faces 94 of the rubber spring 87 and are forced against the faces 93a to compress the spring 87 as the monitor 2 is tilted from a balanced position on the shaft 45.

As shown in FIGS. 1 and 2 the ends of the arms 12 and 13 and the hubs 14, 15 and 16 are adapted, for appearances, to be closed by covers 94, 95, 96, 97 and 98, respectively, that may be secured for example as by snap-on brackets such as the brackets 99 (FIGS. 6 and 7) at the side wall of the elbow hub 14 for the covers 96 and the brackets 25 and 26 on the arms 12 and 13 for the covers 94 and 95.

Leads from the base 5 to the monitor 2 are adapted to be concealed within the support 4. For example, a hub element 17 of the lower hub 15 is provided with a slot 100 in the outer wall thereof for receiving the leads which can then be run upwardly along the lower arm 12 between the brackets 25 and 26 which are spaced for this purpose and can be provided with additional clearance (not shown) for the leads around the screws 24. Similarly, the leads can be run through the bracket 99 on the elbow hub 14 and through the brackets 25, 26 on the upper arm 13, as well as through a slot 101 in the hub element of the upper hub 16. Concealing the leads not only improves the appearance of the terminal but also protects the leads and removes them as obstacles for example in working around the terminal or in positioning the terminal relative to other equipment.

I claim:

1. In a terminal including a base adapted to rest on a supporting surface and a monitor having a display screen and adapted to be connected to output leads from said base, means for supporting said monitor for vertical movement relative to said base comprising a pair of arms including a lower arm and an upper arm, lower pivot means for mounting said lower arm at one end on said base for pivotal movement about a horizontal axis, upper pivot means including a shaft held against rotation for mounting said monitor on one end of said upper arm for pivotal movement about a horizontal axis to tilt said display screen relative to the vertical, first friction means for maintaining said monitor in a tilted position relative to said shaft, elbow pivot means for pivotally interconnecting the other ends of said upper and lower arms for pivotal movement about spaced horizontal axes, means interconnecting said lower and upper pivot means and said elbow pivot means for adjusting the same about the axes thereof upon pivotal movement of said arms about the axes of said pivot means, second friction means for resisting pivotal movement of said arms about said pivot means, and means for counteracting the weight of said monitor relative to the axis of said shaft comprising a resilient sleeve, means for holding said sleeve against rotation relative to said monitor, and means fixed to said shaft and cooperating with said resilient sleeve for resisting movement of said monitor relative to said shaft.

* * * * *